United States Patent
Arcand

[19]

[11] Patent Number: 6,115,931
[45] Date of Patent: Sep. 12, 2000

[54] TAPE ADAPTER WITH INTERCHANGEABLE BRACKETS

[76] Inventor: Stephane Arcand, 819 Trunk Road, Unit 107, Sault Ste. Marie, Ontario, Canada, P6A 3T3

[21] Appl. No.: 09/206,702

[22] Filed: Dec. 7, 1998

Related U.S. Application Data

[63] Continuation-in-part of application No. 08/725,991, Oct. 4, 1996, Pat. No. 5,845,412, which is a continuation-in-part of application No. 08/394,365, Feb. 24, 1995, abandoned.

[51] Int. Cl.$^7$ .................................................. B25H 7/00
[52] U.S. Cl. ............................... 33/668; 33/755; 33/768; 33/770
[58] Field of Search ............................. 33/668, 758, 759, 33/760, 768, 770, 755, 27.02, 27.03, 27.031

[56] References Cited

U.S. PATENT DOCUMENTS

| | | | |
|---|---|---|---|
| 2,349,670 | 5/1944 | Moxey | 33/27.03 |
| 2,651,843 | 9/1953 | Goodford | 33/27.03 |
| 2,768,443 | 10/1956 | Chiaravalloti | 33/27.03 |
| 3,662,471 | 5/1972 | Lynde | 33/770 |
| 3,913,232 | 10/1975 | Marcell | 33/490 |
| 4,023,277 | 5/1977 | Fizer | 33/27.03 |
| 4,766,673 | 8/1988 | Bolson | 33/760 |
| 5,421,100 | 6/1995 | Leore | 33/759 |

FOREIGN PATENT DOCUMENTS

| | | | |
|---|---|---|---|
| 0120902 | 7/1984 | Japan | 33/758 |

*Primary Examiner*—Diego Gutierrez
*Assistant Examiner*—Lydia De Jesus

[57] ABSTRACT

A tape measure device with a measuring tape blade having a swiveling end assembly having a tape measure housing defining a chamber receiving a retractable tape blade of a tape measure. A tape blade attachment assembly is mounted to the tape blade and includes a support plate defining a cylindrical chamber, a slot leading to the cylindrical chamber, the slot also being provided with a recess adapted to receive an angular projection of a locking arm of the locking mechanism, a flexible arm mounted adjacent the slot and a recess on the other side of the flexible arm. The locking arm which is mounted in the slot has an angular projection on one side and a rounded projection on the opposite side from said angular projection which engages the flexible arm. An attachment plate is rotatably mounted to the support plate has a cylindrical post extending therefrom which is seated in the cylindrical chamber and has a rivet extending through the center axis of the cylindrical post and the support plate allowing rotational movement of the attachment plate. A locking mechanism is mounted to the support plate. The attachment plate defines a flange orientated substantially perpendicular to the plane of the tape blade with a keyway adapted to hold an attachment member with a corresponding key.

20 Claims, 10 Drawing Sheets

TAPE ADAPTER WITH INTERCHANGEABLE BRACKETS

RELATED APPLICATIONS

This application is a continuation-in-part of Application Ser. No. 08/725,991, filed Oct. 4, 1996, now U.S. Pat. No. 5,845,412, which is a continuation-in-part of Application Ser. No. 08/394,365, filed Feb. 24, 1995 now abandoned.

FIELD OF THE INVENTION

The present invention relates in general to a swivel head tape measure device and associated attachments which can be mounted to the tape blade that aid the user of the tape measure. Specifically, the invention is directed to an inventive tape measure device with rotatable tape adapter assembly mounted on the end of the tape blade which can receive and hold any one of a number of interchangeable attachment members which are mounted to the tape adapter assembly to enhance the functionality of the tape measure device.

BACKGROUND OF THE INVENTION

Tape measures are commonly used to take measurements of various articles under a variety of conditions. Individuals frequently measure distances greater than an arms length so a need exists for an effective and versatile way to anchor one end of the measuring tape so the tape can be extended to the length necessary to take the measurement. The typical tape measure incorporates an end flange which is of limited usefulness in securing the end of the tape and which easily becomes dislodged from the object to which it is mounted or secured.

The typical tape measure device includes a thin, flexible, narrow steel tape which has a slight upward transverse curvature and typically retractably unrolls from a slot in a compact housing. The curvature is provided to give the unsupported extended steel tape a structural degree of strength and stability when the tape is not supported along its length. However, the slight transverse curvature does not provide the steel tape with enough structural stability to enable the tape to remain straight when measuring large distances. Consequently, the user of a steel measuring tape frequently must find a way of removably attaching the free end of the steel tape to a point on the object being measured.

The standard steel measuring tape is provided with a short metal end flange which serves the dual function of preventing the free end of the steel tape from entering the housing of the tape measure through the slot in the housing when retracted and providing the user of the tape measure with a means of securing the free end of the steel tape to the object being measured. Many people encounter difficulty in taking measurements beyond an arms reach and although the tape measure can be handled by one person for short distance measurements, the need for help when using the tape measure for long distance measurements requires another person to hold the end of the tape when taking a measurement. Furthermore, the flange of the tape blade is frequently inadequate to secure the tape to the object being measured, particularly when the distance being measured is beyond or longer than the arm's reach of the person taking the measurement or when the tape is suspended above the surface being measured and therefore not supported by a flat surface as typically happens when the dimensions of a room are being measured and the end of the tape is secured to a board or the edge of a wall of the room.

A number prior art patents reveal numerous attempts to create mechanisms for securing a tape end by various devices which can be mounted to a tape measure housing. Examples of such attempts are disclosed in U.S. Pat. No. 2,574,272 to McCully issued Nov. 6, 1951; U.S. Pat. No. 2,663,941 to Dart issued Dec. 29, 1953; U.S. Pat. No. 2,711,030 to Drew et. al. issued Apr. 19, 1954; U.S. Pat. No. 3,036,791 to Siggelkow issued May 19, 1962; U.S. Pat. No. 3,021,599 to Odom issued Feb. 20, 1962; U.S. Pat. No. 4,766,673 to Bolson issued Aug. 30, 1988; U.S. Pat. No. 4,924,597 to Tursi issued May 15, 1990; U.S. Pat. No. 5,406,711 to Graham issued Apr. 18, 1995; and Japanese Patent No.59-120902(A) to Nishimura issued Dec. 7, 1984.

U.S. Pat. Nos. 2,663,941 and 3,036,791 are directed to measuring tape housings having tape ends which are secured with magnetic holders while Japanese Patent Number 59-120902(A) is directed toward a linked end assembly with the end member of the linked assembly having a permanent magnet mounted thereto.

Conversely U.S. Pat. No. 2,574,272 shows a hinged tab designed to be used on the end of a steel tape that can be opened from a folded position substantially parallel to the tape to an open locked position that is substantially perpendicular to the tape. The tab when folded may move lengthwise on the tape, and may include a key portion that permits it to be erected only as its proper working position at the end of the tape.

Various attachments to a tape measure are disclosed by: U.S. Pat. No. 2,711,030 which discloses a suction cup pivotally attached to one end of a measuring tape and U.S. Pat. No. 3,021,599 which discloses a combination tool to aid in taking measurements with a tape measure comprising a casing having a flat, elongated base. The casing carries sighting means defining a line of sight parallel to the length of the base. The tool includes a target unit which can be secured to a reference point to hold the end tab of the tape. Another U.S. Pat. No. 4,766,673 discloses a tape measuring system having a housing which is provided with a pencil sharpener, a pencil trimming means (a drawknife) mounted in another corner portion of the housing which is intended to trim a square type of lead pencil used in carpentry, a snap in pencil holding part located at another lateral side of the housing, a recessed area on the face of the housing to accept a memo pad and a belt clip disposed on the rear side of the housing. Because these features are all built into the housing, the features cannot be removed from the tape measuring device or altered to meet the specific requirement.

The present invention overcomes these limitations by providing the user with removable hardware to use in conjunction with the measuring device which can be stored in the measuring device or in a separate kit and also makes these features fully adjustable by the user.

Another related U.S. Pat. No. 4,924,597 discloses a tape measure device which features a housing or casing which has a variety of different mounting devices attached thereto including a suction cup that is attached to the casing by a retractable cord. The suction cup assembly fits into a chamber defined in the casing when the suction cup is not in use. The device further includes magnets and a nail-receiving bore as well as a clip for mounting the device on the user's belt.

U.S. Pat. No. 5,406,711 discloses an assembly which uses a measuring tape for marking and cutting a straight line on an upper surface of the work piece. The measuring tape has an engagement tongue protruding from the leading edge of the tape and a reel lock for fixing the tape in a locked position when the tape is extended from the case. A hand tool, such as a knife or marking implement works in cooperation with a guide and an engagement slot. The tongue of the measuring tape engages the slot of the hand tool, thereby connecting the hand tool to the tape. This device is bulky and difficult to use.

The present invention provides a much more streamlined structure making it easy to use the blade guide feature on a vertical or horizontal surface by one person and also does not depend on a bulky attachment to the casing of the tape measure.

The present invention was developed to provide the user with a set of detachable hardware for use to aid the user in making and recording measurements and in cutting objects with precision. The prior art lacks the versatility, removability and portability of the present invention. The invention is comprised of an inventive adapter assembly that is secured to the end of a tape measure and a plurality of detachable attachments that fit on the adapter assembly and provide the user with a suction cup, magnet, pin or hook means, or blade guide to facilitate the taking of measurements.

SUMMARY OF THE INVENTION

An inventive tape measure device with interchangeable attachments is comprised of a tape measure device with a retractable tape blade having a built in adapter assembly which is permanently mounted to end of the tape measure blade. A plurality of interchangeable attachments having the same base construction can be fastened to the adapter assembly to enhance the functionality of the tape measure device.

The inventive tape adapter assembly of the present invention solves existing prior art problems by providing the tape measure device with a means of removably attaching a selected attachment, from a selection of attachments, to the end of the blade of the tape measure device so that the same can be used to securely attached the end of the tape for a number of functions. Each attachment can be used on a wide range of materials so that the user can quickly modify the tape for attachment to practically any object or surface the user is likely to encounter. The tip assembly can accommodate many means of tape attachment including a suction cup member, a screw member, a pin member, a magnet member and the adapter can also be easily fitted with various other attachments which can be used to removably attach a glass cutting wheel, knife or blade member to the end of the steel measuring tape so that the blade can be used in conjunction with the steel tape to cut or score an object using the tape as a guide to ensure accurate cutting. The invention also provides the user of a standard steel tape measuring device with a means for recording the measurements taken with tape by providing appropriate structures on the side of the casing to accommodate note pads and pencils and scoring devices for scratching or scoring the object being measured to record a location on the object.

Accordingly, it is an object of the present invention to provide the user of a steel measuring tape with an adapter assembly and interchangeable attachments which can be used to attach the tape to a wide variety of surfaces including relatively smooth steel, glass, wood, rough lumber or finished wall board or plaster.

It is also an object of the present invention to provide a tape adapter assembly with interchangeable attachments that facilitates the use of any standard tape measure which can be securely attached to a broad variety of different surfaces or objects of various dimensions.

It is another object of the invention to provide a number of attachments including a suction cup member, pin member, screw member, hook member and magnet member, as well as attachments which can be used to removably attach a knife or blade member to the end of the steel measuring tape so that the blade can be used in conjunction with the steel tape to cut or score and object using the tape as a guide to ensure accurate cutting. The pencil clip holder attachment can be used the same way to scribe a cutting line on a flat surface of working material.

The pin, screw, suction cup, magnet, and brick attachments allow the user to take measurements from any objects or surfaces such as smooth steel, glass, soft and hard wood, rough lumber, wall board or plaster surfaces and from brick surfaces with adequate spacing between the mortar.

It is another object of the invention to provide the user with a glass cutting bracket attachment which removably mounts to the end of the adapter assembly and has a small built-in glass cutting wheel which allows the user to cut or score glass accurately by using the tape as a guide.

It is yet another object of the invention to provide a pencil clip holder attachment which is removably mounted to the end of the adapter assembly to accommodate a standard pencil which is used to scribe lines on flat surfaces of material including plywood, particle board and chip board accurately by using the tape as a guide.

It is another object of the invention to provide a pencil clip holder which is mounted at the rear of the tape measure chassis which provides easy and quick access to a pencil when needed by the user. The pencil clip holder is designed to rotate in two positions, either in a vertical upright position or rotated in a flat horizontal position for different applications.

It is an object of the invention to provide the user with the ability of taking measurements from different angles by simply disengaging a thumb lock located on the adapter assembly of the tape measure blade which in turn enables the flange to swivel freely allowing the user to take measurements from any angle or perimeter from the point being measured.

It is yet another object of the present invention to define a tape adapter which can be provided with a utility knife attachment which can accommodate a knife blade so the tape can be used to guide the blade when the user is cutting various items including wall board, ceiling tile or insulation.

Still another object of the present invention to provide a tape adapter with a means for attaching a pin or similar type of fastener to enable the user to secure the tape to the object being measured.

Yet a further object of the present invention is to define a tape adapter which can rotate relative to the plane of the tape blade to change the angle the tape forms with a reference surface on the object being used to enable the user to make measurements at various angles.

It is another object of the invention to provide the formation or creation of an arc and scribe tool by locking the flange in a 90° position using the pencil and pencil clip holder located on the tape measure to draw arcs and scribe lines on flat surfaces of working material.

Another object of the present invention is to provide pad and marking tool holders which can be mounted on any 12, 16 or 25 foot tape measure housing.

In the accompanying drawings, there is shown an illustrative embodiment of the invention from which these and other objectives, novel features and advantages will be readily apparent.

DETAILED DESCRIPTION OF THE INVENTION

The inventive tape adapter assembly and the attachments used in the assembly are generally shown FIGS. 1 through 21. The best mode and preferred embodiment of the tape adapter assembly invention is shown in FIGS. 1 through 3 and 5 through 10.

The inventive tape measure housing 30 holds a standard known retractable spring loaded tape blade 43 within its interior chamber. The tape measure housing 30 has a base 38 which defines a rectangular slot 35 through which the tape blade passes. The slot 35 has a height which is greater then the thickness of the tape blade 43 and the adapter assembly 40 mounted thereto. The slot 35 is provided with a small upward recess which is designed for clearance of the thumb lock latch 58 when the end of the tape measure blade 43 is retracted in the housing 30 of the tape measure device. The flange 70 acts as a stop in the same manner as a conventional tape measure to keep the tape measure blade from being withdrawn into the housing chamber. If an attachment 80 is mounted onto the adapter assembly 40, then screw head 81 of the attachment acts as the stop.

The tape measure housing 30 has a front face wall 31 which is secured to and extends from the base 38. A pair of side walls 36 are secured to and help reinforce the front face wall 31 and also extend from the base 38. The front face wall 31, the side walls 36, base 38 and back wall 37 to form an internal chamber that is designed to receive the blade of a steel tape in a coiled orientation. A standard tape lock 39 is provided on the top of the housing 30. If desired the entire housing can be cast or injection molded.

The tape measure housing 30 also has a steel belt clip 32 located on the back wall 37 of the housing 30 which is fastened to the wall by a screw 33. The top part of the tape measure housing 30 is covered with a rubber grip 34 to provide the user with a comfortable means of griping the hand held tape measure unit when taking measurements.

Figure 7:
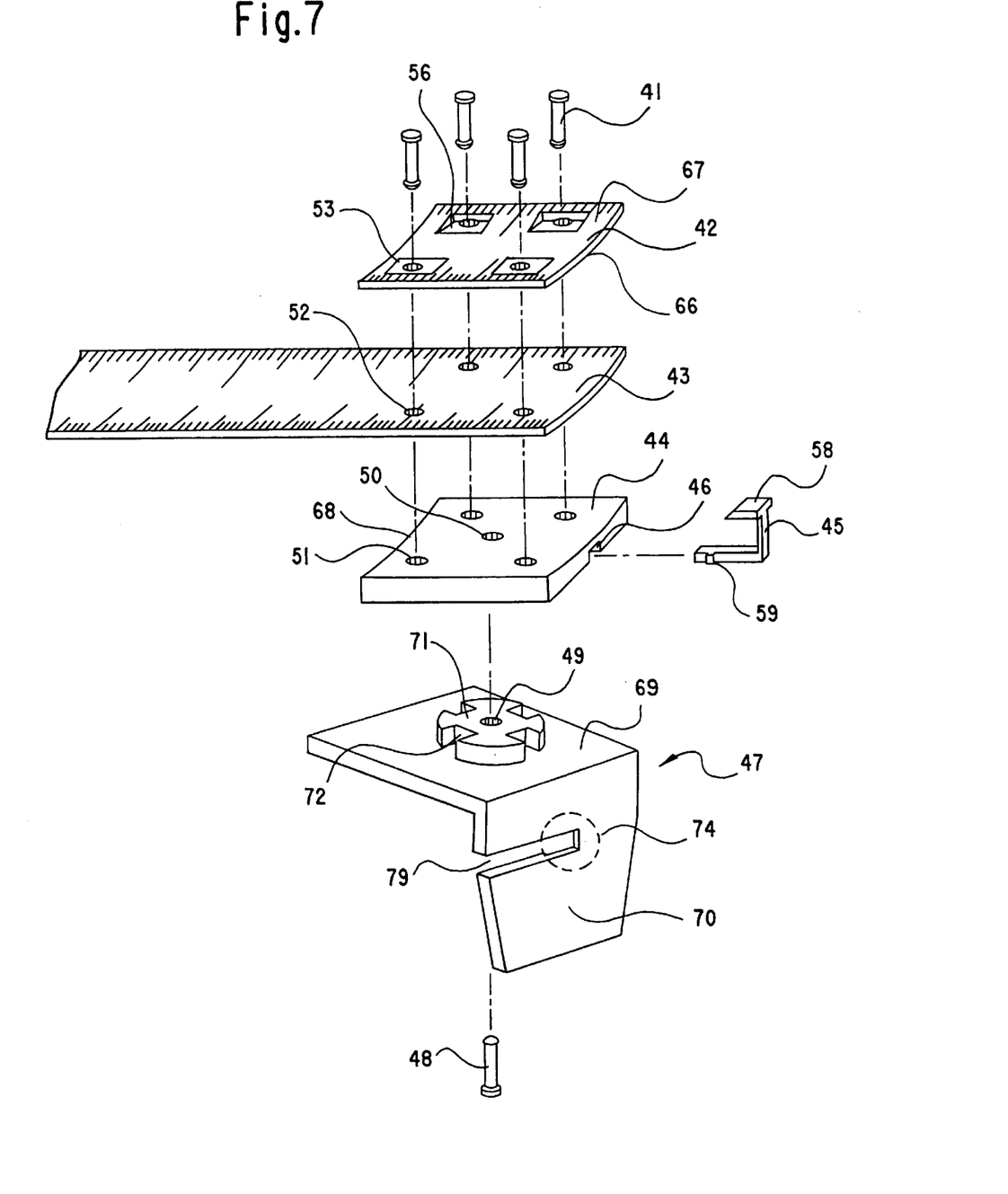
FIG. 7 is an enlarged exploded perspective view of the components of the adapter assembly of the invention.
Figure 8:
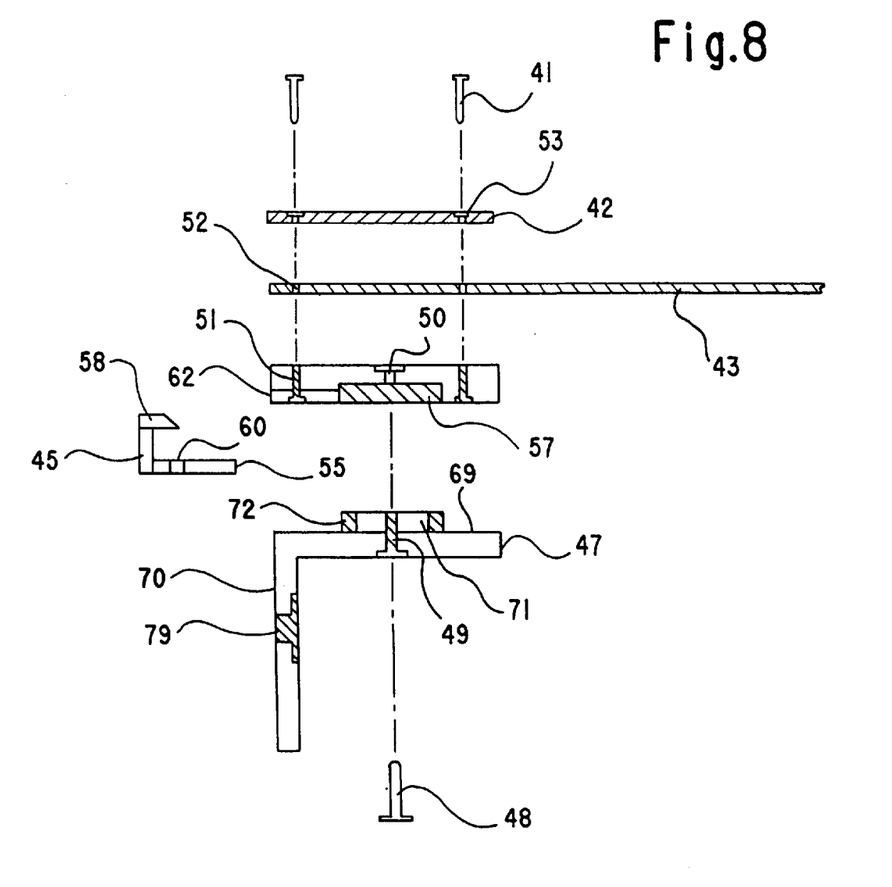
FIG. 8 is a cross sectional side elevational view in reverse of the adapter assembly shown in FIG. 7.
Figure 9:
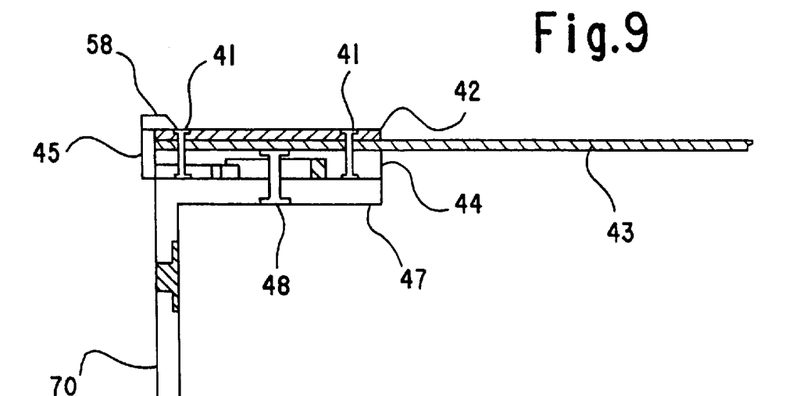
FIG. 9 is a cross sectional view of the assembled adapter assembly shown in FIG. 8.

The adapter assembly 40 with built-in swivel and thumb lock has five main components, namely, a top plate 42, a steel tape blade 43, a bottom plate 44, thumb lock 45 and universal flange member 47.

The top plate 42 is a steel plate with a slight upward transverse curvature 66 that sits on the curved top surface of the steel tape blade 43. The top plate 42 is stamped with measurement readings over its upper curved surface 67 to provide the user with full visual tape measure readings. The top plate 42 is designed to sit over the end portion of the steel tape blade 43.

The steel top plate 42 has spaced square recessed portions 56 surrounding apertures 53 which are designed to receive the rivet heads of the rivets 41 and allow the rivet heads to sit flush on top of the apertures. The recessed portions ensure that the rivets 41 are in a straight position when fastening the other parts of the adapter assembly together. The steel tape blade 43 is a standard steel tape measure blade with a slight upward transverse curvature and has four identically spaced apertures 52 at its end to receive the steel top plate 42 and the rivets 41. The holes 53 of the steel top plate 42 and holes 52 of the steel tape blade 43 are axially aligned with each other.

The steel tape blade 43 also engages the bottom plate 44 which has a slight upward transverse curvature 68 designed to fit on the underside of the steel tape blade 43 slight upward transverse curvature to ensure that the parts fit perfectly together. The bottom plate 44 also has four identically spaced apertures 51 cut therethrough which receives the rivets 41 permanently fastening the top plate, tape blade and bottom plate together. Before assembling the universal flange member 47 to the bottom plate 44 the thumb lock 45 is placed in the slot 46 of the bottom plate 44.

Once the thumb lock 45 is in place, the universal flange member cylinder 71 which is integrally formed with or secured on the top portion 69 of the universal flange member 47 is fit into the bottom plate cylindrical cavity 57 cut into the underside 65 of the bottom plate 44. The lock cylinder 71 defines four locking notches 72 is rotatably fastened in the cylindrical cavity of the bottom plate 44 by a bottom rivet or pin 48 which is received in aperture 49 of the universal flange member 47 and aperture 50 of the bottom plate 44. The rivet 48 permanently fasten the two parts (bottom plate, universal flange member) together while allowing the universal flange member to rotate with respect to the bottom plate forming the entire assembly of the universal flange with a built-in swivel and thumb lock.

The built-in swivel and thumb lock is designed to lock the universal flange member 47 in a straight or rotated position for the purposes of allowing the user to take measurements from any angle.

Figure 10:
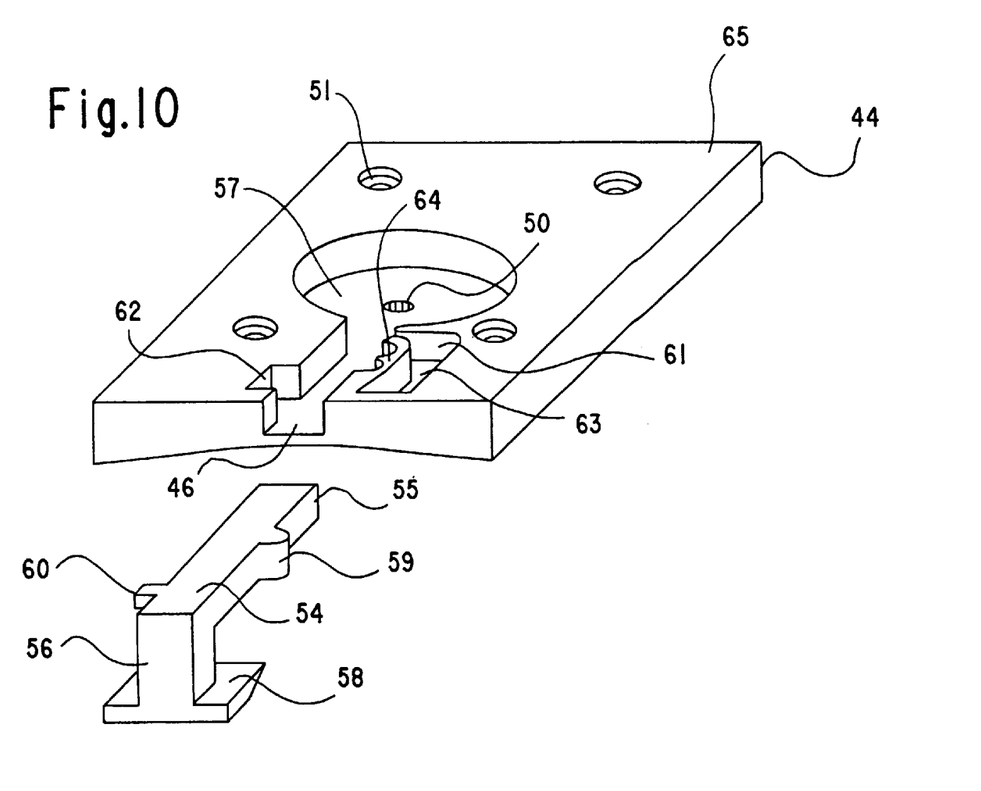
FIG. 10 is an enlarged perspective view of the underside of the adapter assembly bottom plate with the thumb lock removed in an exploded view.
Figure 11:
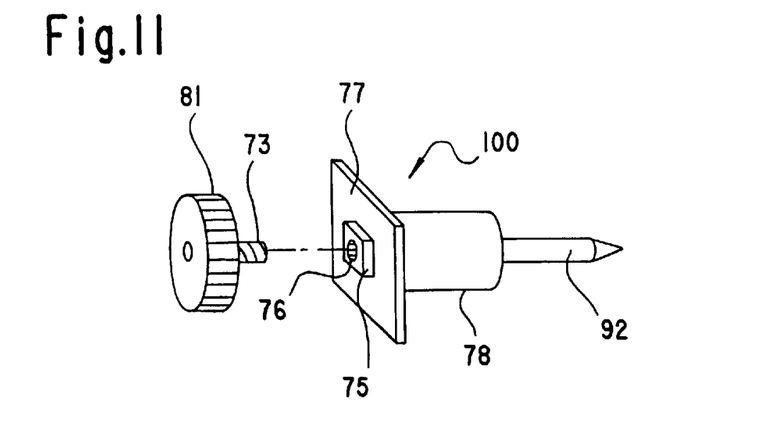
FIG. 11 is an enlarged side perspective exploded view of a pin attachment for use in the adapter assembly of the tape measuring device.
Figure 12:
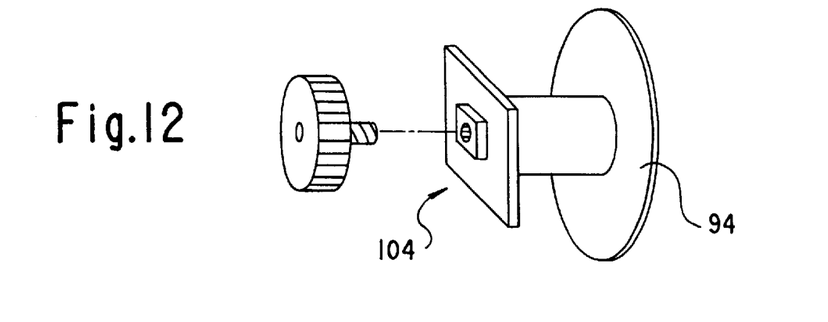
FIG. 12 is an enlarged side perspective exploded view of a suction attachment for use in the adapter assembly of the tape measuring device.
Figure 13:
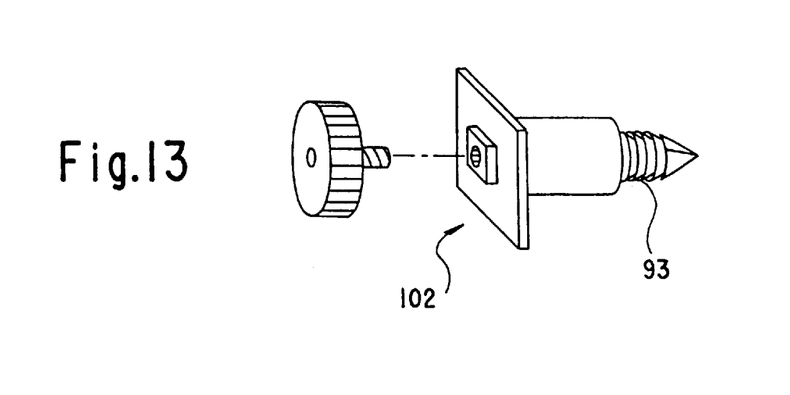
FIG. 13 is an enlarged side perspective exploded view of a screw attachment for use in the adapter assembly of the tape measuring device.
Figure 14:
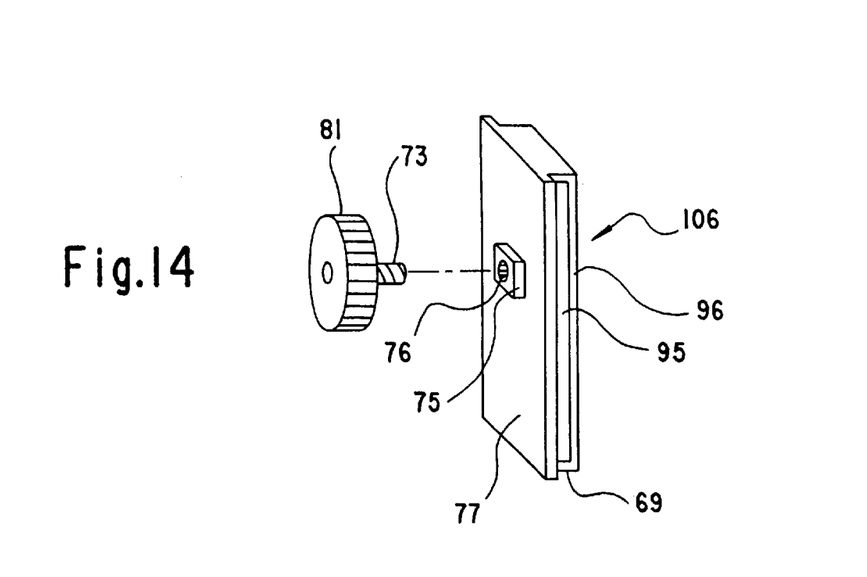
FIG. 14 is an enlarged side perspective exploded view of a knife blade attachment for use in the adapter assembly of the tape measuring device.
Figures 15, 16, 17, 18, 19, 20:
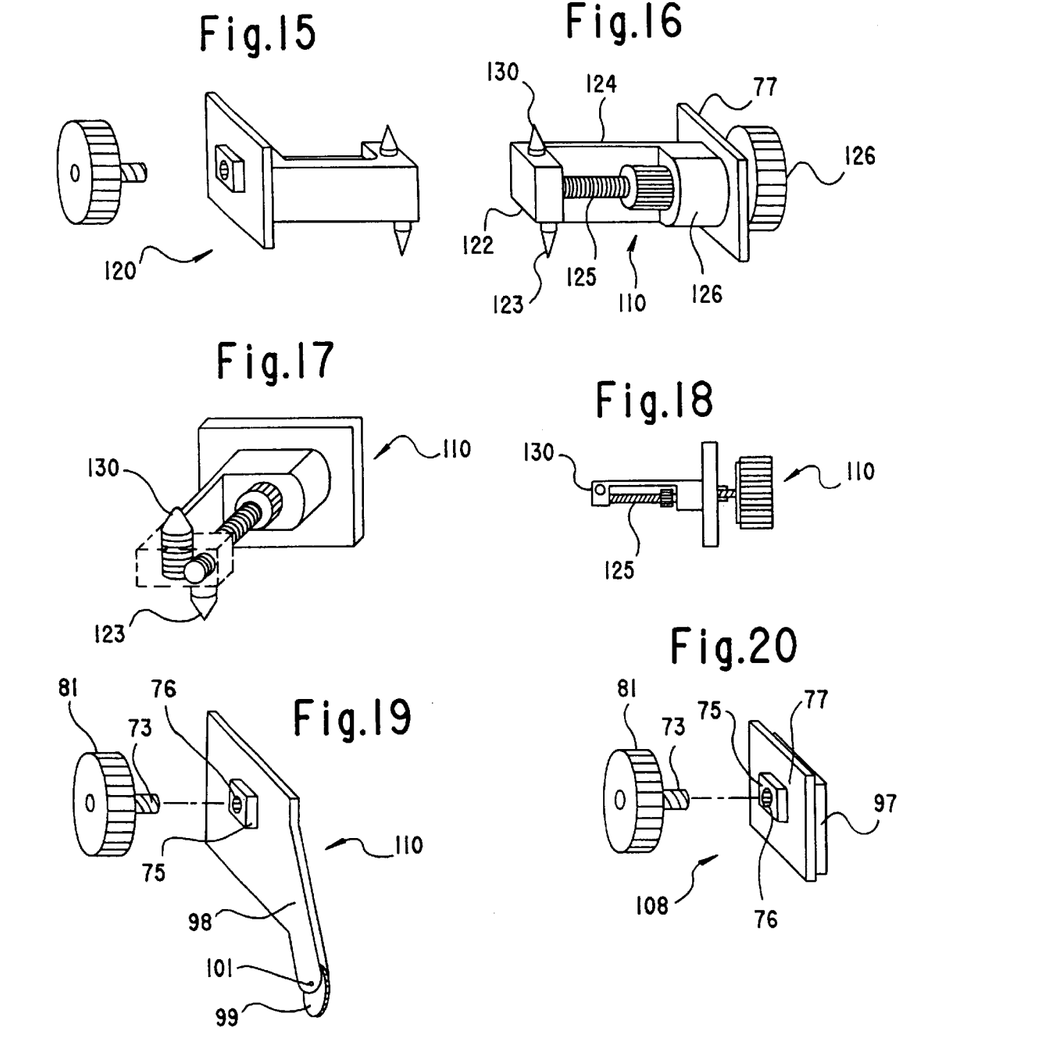
FIG. 15 is an enlarged side perspective exploded view of a brick attachment for use in the adapter assembly of the tape measuring device.
FIG. 16 is a reverse side perspective view of the brick attachment as shown in FIG. 15.
FIG. 17 is a front elevational perspective view of the brick attachment as shown in FIG. 15.
FIG. 18 is a top plan view of the brick attachment as shown in FIG. 16.
FIG. 19 is an enlarged perspective exploded view of a glass cutter attachment for use in the adapter assembly of the tape measuring device.
FIG. 20 is an enlarged front perspective exploded view of a magnet attachment for use in the adapter assembly of the tape measuring device.
Figure 21:
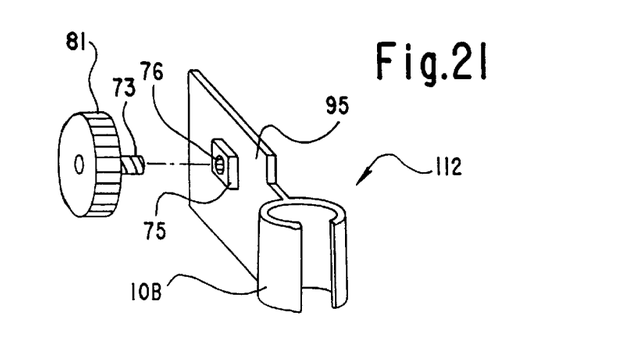
FIG. 21 is an enlarged perspective exploded view of a pencil holder attachment for use in the adapter assembly of the tape measuring device.

The thumb lock mechanism functions are located in the internals of the bottom plate 44 and operates as follows. The thumb lock 45 is shaped at a 90° angle and has a linear member base 54 with a perpendicular neck 56 extending therefrom and a thumb lock tab 58 is positioned on the neck 56. The thumb lock tab 58 sits on the surface of the top plate 42 when the parts are assembled together which provides the user with means of placing his or her thumb upon the thumb lock tab 58 of the thumb lock 45 for disengaging or engaging the thumb lock 45 when the user wishes to use the swivel feature for measuring angles.

The thumb lock 45 fits in the slot 46 which extends from the exterior of plate 44 into the cylinder cavity 57. The thumb lock 45 has a small thumb lock arm 60 extending from the base member 54 and a small round protruding curvature 59 extending from the opposite side of the base member 54.

When the thumb lock 45 is placed in the slot 46, the small thumb lock arm 60 fits into a small recessed portion 62 leading off of the slot 46. This recessed portion prevents the thumb lock 45 from moving too far in or out of the bottom plate slot 46 keeping the thumb lock in place after assembly. The round protruding curvature 59 located on the other side of the base member 54 is designed to fit in an undulating arcuate out portion 63 of the flexible clip 64 located adjacent the slot 46. The clip 64 holds the thumb lock 45 in an engaged locking position or in an unengaged unlocked position.

A bottom rivet 48 in the universal flange member 47 extends through aperture 49 and bottom plate aperture 50 fastening them together creating the swivel feature with both parts conjoined.

In order to lock the universal flange member 47 in a straight or 90° angle with respect to the axis of the tape blade keeping it from moving freely, the user simply pushes in the thumb lock tab 58 of the thumb lock 45 towards the cylinder cavity 57 allowing end 55 of the thumb lock to engage a notch 72 of cylinder 71.

As the thumb tab 58 of the thumb lock 45 is being pushed in, the rounded protruding curvature 59 of the thumb lock 45 slips into the second curved area of the flexible clip 64 and the end 55 of the base member 54 passes into the cylinder cavity 57 and into the notch 72 of the extension cylinder 71 keeping the thumb lock 45 engaged and locked into place.

There is a large recessed portion 61 in the underside of the bottom plate 44 located on the opposite side of the grooved out flexible clip 64 designed to provide the room needed for the flexible plastic or metal molded-in clip 64 to move outward when the thumb lock 45 is being pushed through to the notch 72 of the lock cylinder 71 locking the same within the cylinder cavity 57.

A slot 79 is formed in the front plate 70 of the universal flange 47 to receive the similarly constructed interchangeable attachments 80. The attachments 80 are constructed with a cylindrical extension or post 78 secured to and extending from a base face plate 77 and a small key block 75 located on the opposite side of the base face plate 77. The key block, face plate and post are provided with a threaded bore 76 which receives the threaded shank 73 of the thumb screw 81 as a means of fastening the attachment 80 in the slot 79 of the universal flange member 47 when the user wishes to take a measurement from any surface or object beyond an arms reach.

The thumb screw 81 of the attachment has an end tapered portion allowing the screw to be readily received by the threaded bore. The tapered portion of the thumb screw 81 allows the attachment 80 to be firmly secured in place preventing the entire attachment 80 from sliding out of the slot or keyway 79 on the front face plate 70 when the user is taking measurements or using the other bracket attachments for whatever application required. The flange or front plate 70 is countersunk on its inner surface as seen in FIG. 7 to form a circular recess 74 so that the thumb screw head can be countersunk against the front plate 70 when fastening an attachment 80 preventing the attachment from sliding off when in use.

These attachments are designed with the same mounting and support system with the exception of the various job specific pieces that extends from the cylinder 78, or the front face plate 77.

In these attachments, the pin attachment 100 (FIG. 11) the pin 92 extends from the post 78. The pin member 92 comprises a straight or curved hardened metal structure with a pointed proximal end to piece objects to anchor the end of the tape. The pin 92 can be straight, or have various degrees of curvature and lengths. Likewise in the screw attachment 102 (FIG. 13) the screw 93 extends from the post 78. The suction cup attachment 104 (FIG. 12) has a suction cup 94 extending from the post 78. The suction cup 94 is preferably made from santoprene thermoplastic rubber or the equivalent thereof with a hardness equal to 55 shore A and the suction cup should have a smooth surface on its inner face with no radius on the edge of the cup portion.

In the utility knife attachment 106 (FIG. 14) a front plate 96 is attached to the face plate 77 of the attachment 80 by two parallel spaced small extension legs 69 which form a slot 95 between the front plate 96 and front face plate 77. This slot is designed to receive the blade of a standard utility knife.

A magnet attachment 108 (FIG. 20) has a magnet 97 attached to the front face plate 77. The glass cutting attachment 110 (FIG. 19) comprises a thin angled extension arm 98 integrally formed on the face plate 77. The arm 98 defines a yoke 101 at one end and a small glass cutting wheel 99 rotatably mounted in the yoke 101.

The pencil clip holder attachment 112 (FIG. 21) consists of a pencil clip 103 which is secured to or integrally formed with face plate 77.

A brick attachment 120 (FIGS. 15–18) is designed to take measurements from brick or block surfaces with adequate spacing therebetween. The brick attachment 120 is constructed with an extension block 122 which is secured to a longer side plate 124 which is in turn secured to an extension base block 126 secured to the front face plate 77. A long threaded shaft 125 attached to a round cylindrical thumb screw head 128 which extends through the front extension block 122 all the way through to the extension base block 126 attached to the square front face plate 77. A stationary pointed shaft 123 is secured to the side of the front extension block 122. The threaded shaft 125 which ends in thumb screw head 126 is designed to rotate the threaded pointed end of the smaller shaft 130 located on the opposite side of the front extension block housing 122. This rotation is designed to elevate the small pointed end shaft 130 upward or downward allowing the user to place the end of the brick bracket between a brick or block with adequate spacing to take a measurement from that surface area.

Figure 1:
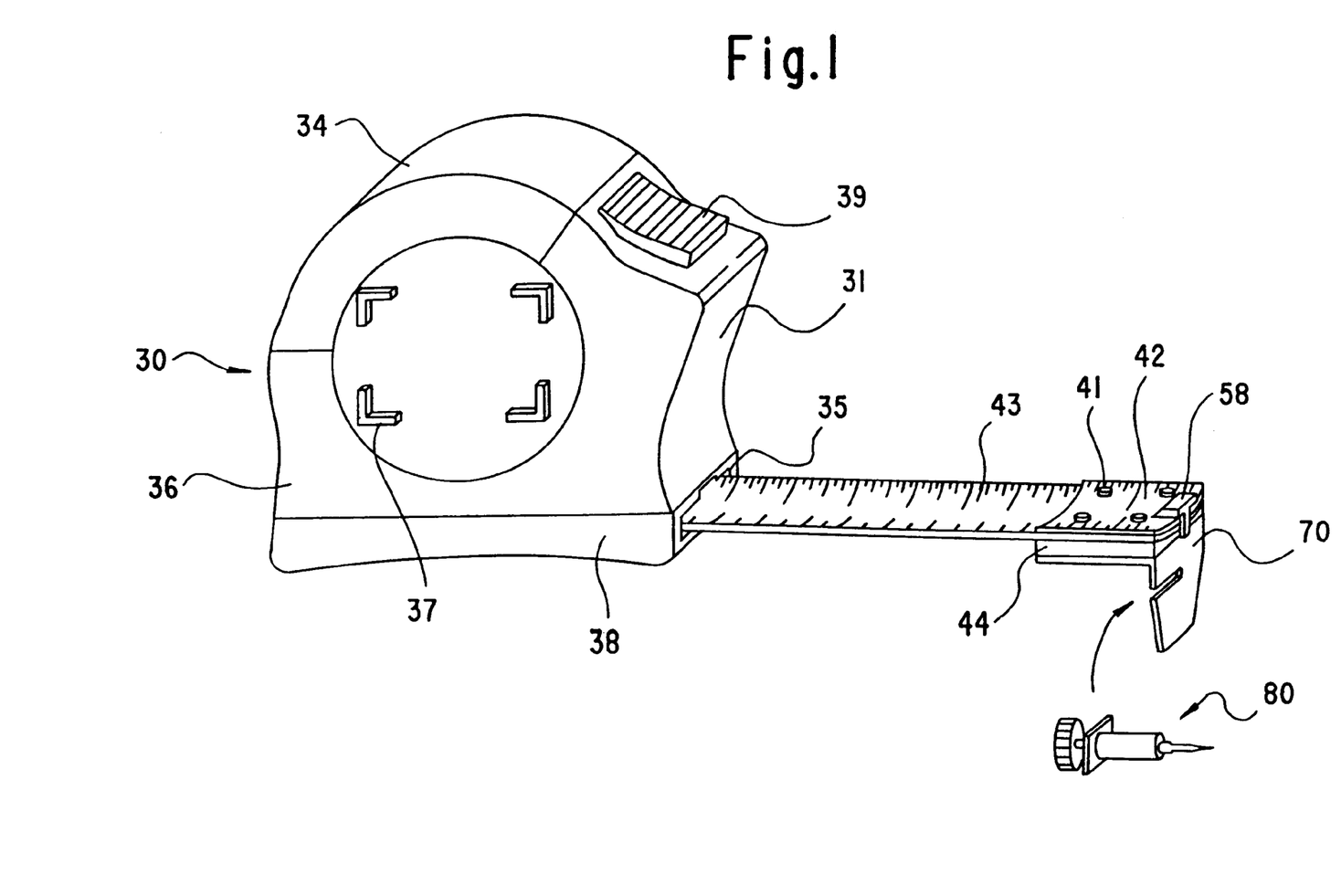
FIG. 1 is a side perspective view of the inventive adapter tape measuring apparatus with an exploded pin attachment.
Figure 2:
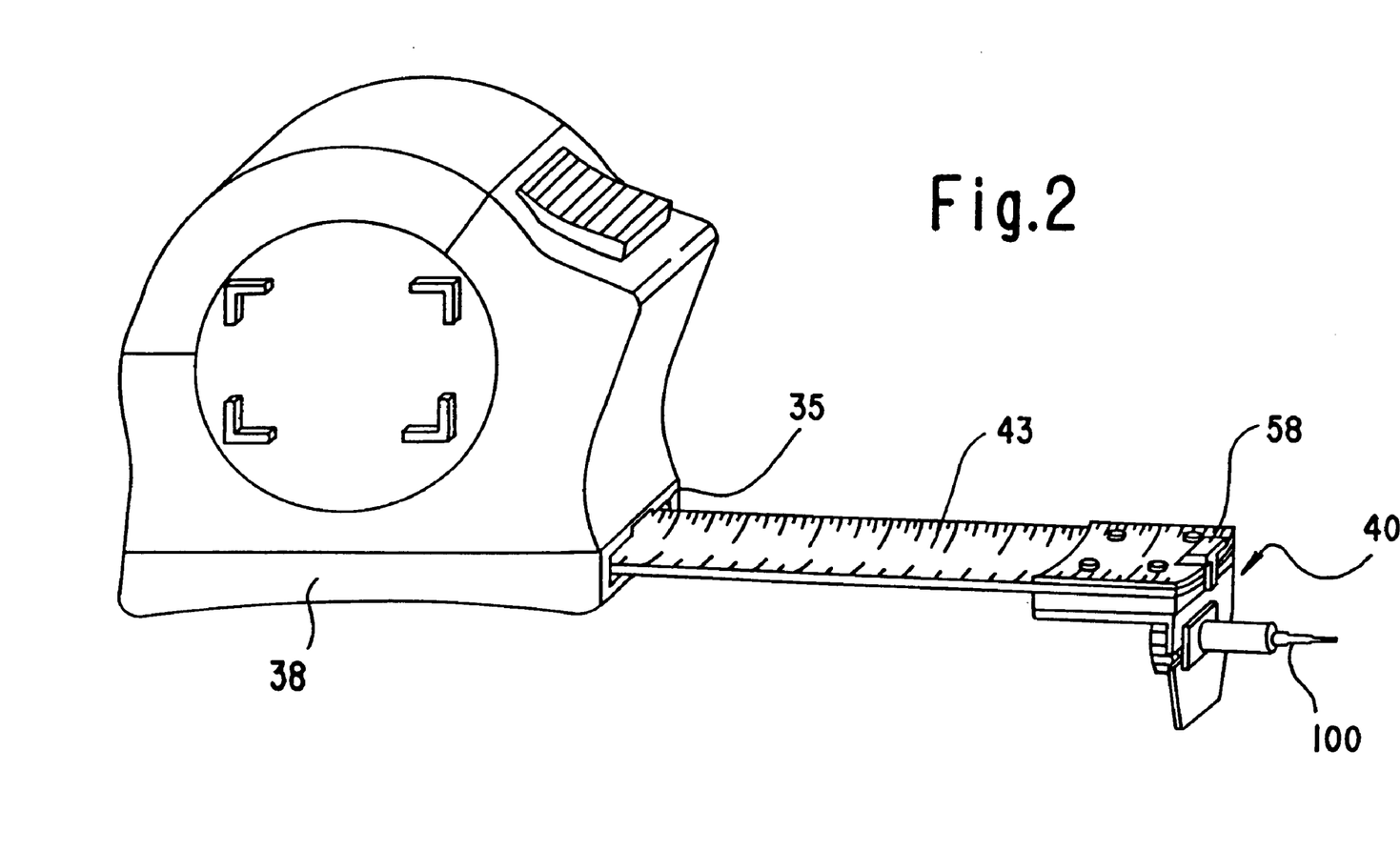
FIG. 2 is a side perspective view of the inventive adapter tape measuring apparatus as shown in FIG. 1 with the pin attachment secured to the adapter assembly.
Figure 3:
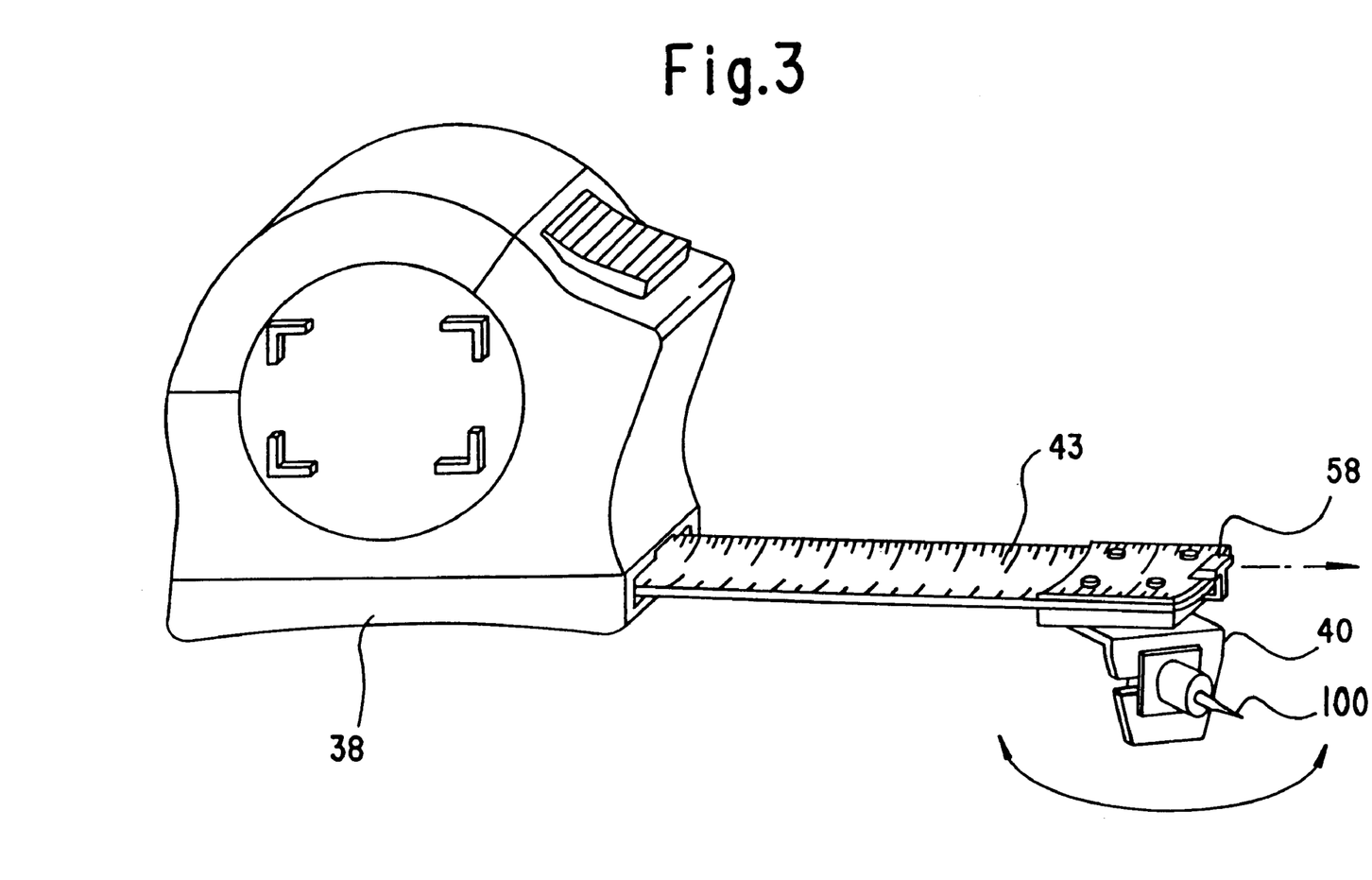
FIG. 3 is a side perspective view of the inventive adapter tape measuring apparatus as shown in FIG. 2 with the pin attachment shown in a rotated position.
Figure 4:
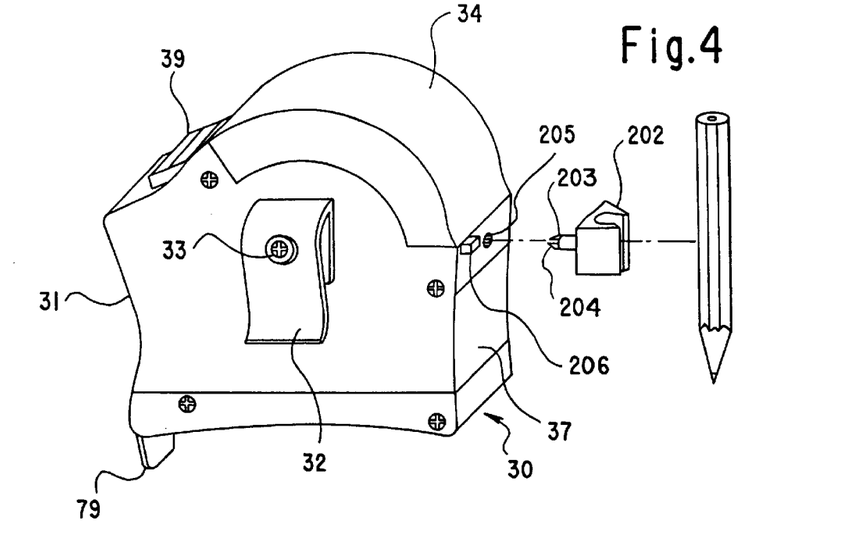
FIG. 4 is an opposite side and rear perspective view of the inventive adapter tape measuring apparatus as shown in FIG. 1 with an exploded rotating pencil assembly.
Figure 5:
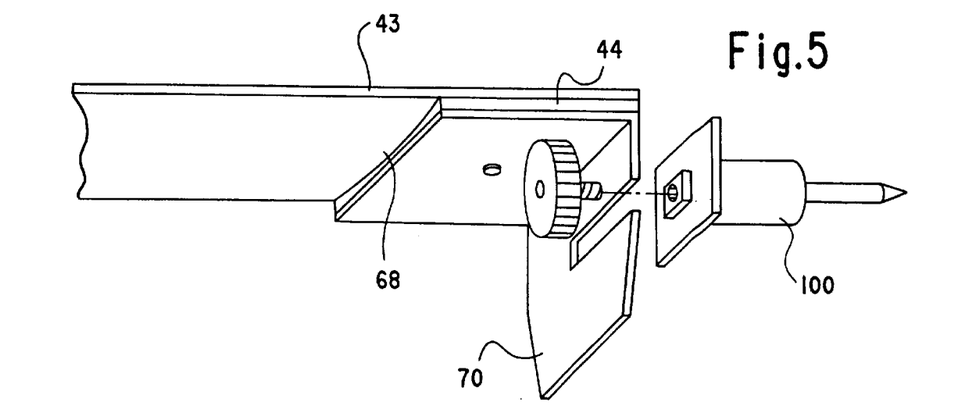
FIG. 5 is an enlarged perspective view of the pin attachment of FIG. 2 being mounted on the adapter assembly flange.
Figure 6:
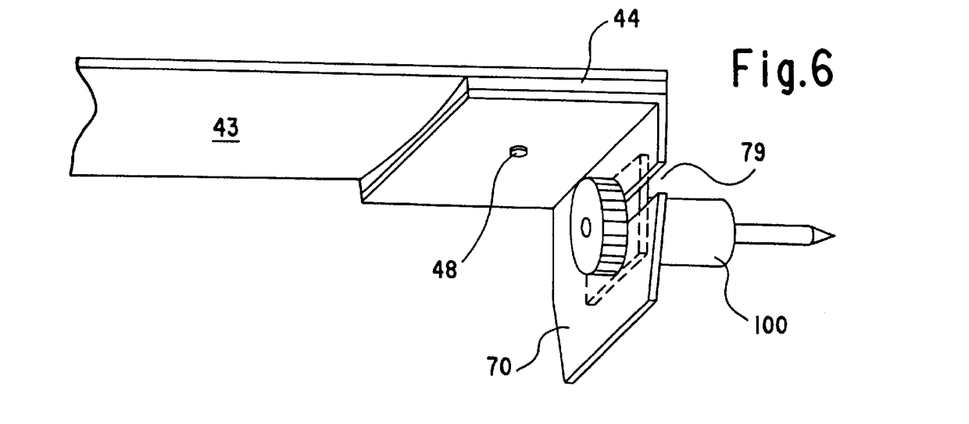
FIG. 6 is a view of the pin attachment of FIG. 5 mounted on the adapter assembly flange.

The tape measurement housing 30 has four rectangularly orientated small "L"shaped 90° angled ribs 37 slightly protruding from the side wall face of the tape measure housing 30 which allows the user to stick a Post-It Note pad within the rib configuration keeping the pad in place. A pencil 200 fits into a pencil clip holder 202 as best seen in FIG. 4 is secured to the rear of the tape measure housing 30. The pencil clip holder 202 is provided with a shaft 203 with a slotted barbed end 204 designed to snap into aperture 205 located at the rear of the tape measure housing 30. The slotted end barb has a tapered end which snaps into aperture 205 keeping clip 202 firmly in place while allowing the clip to be rotated into a horizontal position. A small extension block 206 is located on the back side of the tape measure housing 30 on the upper side of the pencil clip holder 202 which is designed to keep the pencil clip holder from rotating 365° allowing the pencil clip holder to only be positioned in vertically upright or rotated in a flat horizontal position so it may be used in combination with the pin bracket attachment for drawing arc's and scribe lines.

When the attachment assembly 40 is secured to the end of the steel tape 43 as shown in FIG. 7, any one of a number of tape adapter attachments as previously described can be attached to the tape adapter. As an example of the same, the suction cup attachment is used to secure the end of the steel tape to any flat relatively smooth surface on which a suction cup can be affixed. When taking a measurement with the suction cup, pin, screw and brick attachments installed on the adapter, the user simply adds one half (½) inch to the measurement indicated on the tape to compensate for the added length of the suction cup 94, etc. and support cylinder 78. The various attachments 80 are shown in FIGS. 11 through 21. The user subtracts one half (½) inch when the flange member is locked at a 90° position with respect to the axis of the tape blade.

Figure 22:
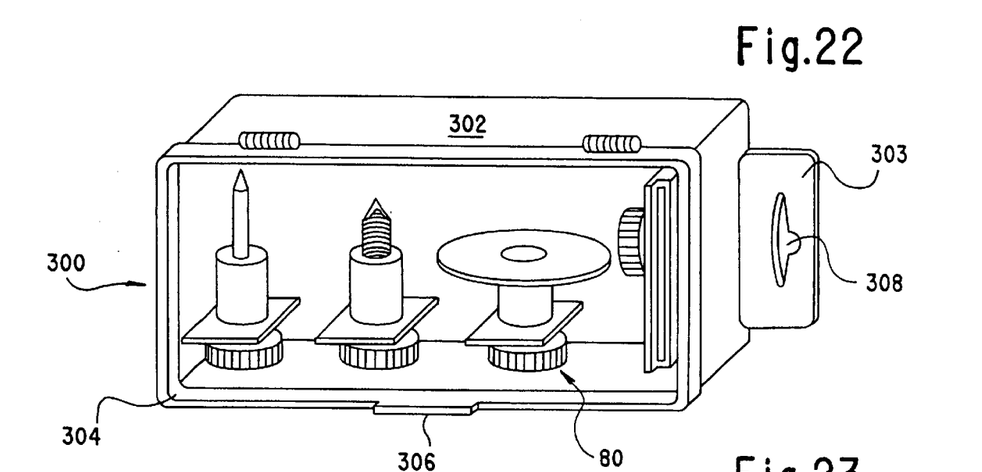
FIG. 22 is a side elevational view of a kit container holding attachments used with the invention.
Figure 23:
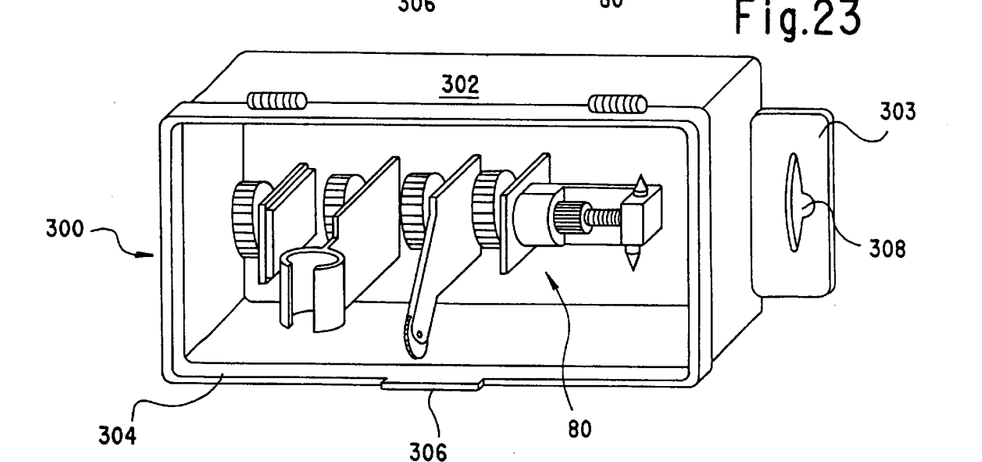
FIG. 23 is a side elevational view of a kit container holding additional attachments used with the invention.
Figure 24:
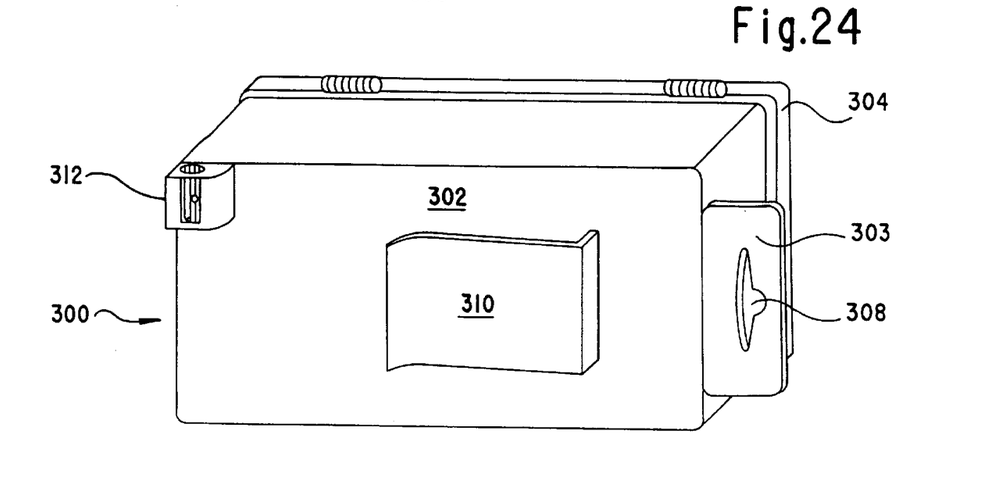
FIG. 24 is a rear perspective view of the kit container shown in FIGS. 22 and 23.

A carrying case 300 has been designed to carry the various attachments used with the tape measurer device. As shown in FIGS. 22–24 a case housing 302 is provided with a clear hinged door 304 having a locking clasp 306 to avoid losing any of the attachments 80. A tab member 303 with a butterfly hole 308 is secured to and extends from the housing 302. This butterfly hole can receive a nail or screw for easy storage on any work bench or wall. A clip 310 is located at the rear of the case housing so that the user can conveniently attach the case to a work belt or tool pouch. A pencil sharpener 312 is secured to the lower rear surface of the case to provide the user with a means of easy access to sharpening a pencil when needed.

In the forgoing description, the invention has been described with reference to a particular preferred embodiment, although it is to be understood that specific details shown are merely illustrative, and the invention may be carried out in other ways without departing from the true spirit and scope of the following claims:

I claim:

1. A tape measure device with a rotating attachment assembly, comprising:

a tape measure housing comprising a base, a front wall secured to one end of said base, a plurality of side walls secured to said base and said front wall and a back wall secured to said base and said side walls to form a chamber, a retractable tape measuring blade mounted in said chamber;

an attachment assembly selectively holding an attachment member mounted to said tape measuring blade, said attachment assembly comprising a support plate secured onto an end of said tape measuring blade and a tip member rotatably mounted to said support plate, said tip member including a flange section which extends angularly from the tape measuring blade with receiving means to receive an attachment member and locking means mounted to said attachment assembly to lock said tip member in a predetermined position.

2. A tape measure device as claimed in claim 1 wherein said support plate defines a cylindrical chamber and a channel leading to said chamber, said tip member defining a cylindrical projection extending from a surface of said tip member which is seated in said cylindrical chamber said tip member defining a keyway, an attachment member mounted in the keyway of said tip member, said attachment member comprising a base plate, a post secured to one side of said base plate, a key member secured to an opposite side of said base plate adapted to be received in said keyway, fastener means moveably mounted to said key member and an attachment component secured to said post.

3. A tape measure device with a rotating attachment assembly as claimed in claim 2 wherein said attachment component is a suction cup.

4. A tape measure device with a rotating attachment assembly as claimed in claim 2 wherein said attachment component is a magnet.

5. A tape measure device with a rotating attachment assembly as claimed in claim 2 wherein said attachment component is a brick pin mechanism.

6. A tape measure device with a rotating attachment assembly as claimed in claim 2 wherein said attachment component is a screw.

7. A tape measure device with a rotating attachment assembly as claimed in claim 2 wherein said attachment component is a pin.

8. A tape measure device with a rotating attachment assembly as claimed in claim 2 wherein said attachment component is a rotatable pencil clip holder.

9. A tape measure device as claimed in claim 1 wherein said attachment member is removably mounted to said tip member, said attachment member comprising a base plate, a key member secured to a side of said base plate, fastener means moveably mounted to said key member and a cutting component secured to said base plate.

10. A tape measure device with a rotating attachment assembly as claimed in claim 9 wherein said cutting component is a glass cutter wheel.

11. A tape measure device with a rotating attachment assembly as claimed in claim 9 wherein said cutting component is a knife.

12. A tape measure device with a rotating attachment assembly, comprising:

a tape measure housing forming a chamber for receiving a tape blade of a tape measure;

an attachment assembly comprising a support plate secured onto said tape blade and a tip member pivotally mounted to said support plate, means to lock said tip member in a predetermined position moveably mounted in said support plate for selective engagement with said tip member, said tip member defining a keyway and an attachment mechanism removably mounted to said tip member in said keyway, said attachment mechanism comprising a base plate, a key member with a threaded bore secured to a side of said base plate, and a threaded fastener moveably mounted in said key member threaded bore to secure said attachment mechanism to said tip member.

13. A tape measure device with a rotating attachment assembly as claimed in claim 12 including a plurality of angular ribs mounted on a side wall of said tape measure housing, said angular ribs being oriented to form the four corners of a rectangle to receive and hold a notepad.

14. A tape measure device with a rotating attachment assembly as claimed in claim 12 wherein said housing has a side wall with a belt clip removably mounted thereto.

15. A tape measure device with a rotating attachment assembly as claimed in claim 12 including a resilient member mounted to said housing.

16. A tape measure device as claimed in claim 12 wherein said support plate defines a cylindrical chamber, a groove leading into said chamber and a recess adjacent a flexible arm, and a lock arm mounted in said groove engaging said flexible arm.

17. A tape measure device with a measuring tape blade having a swiveling end assembly, comprising:

a tape measure housing defining a chamber receiving a retractable tape blade of a tape measure;

a tape blade attachment assembly rotatably mounted to a free end of said tape blade, said attachment assembly comprising a support plate, an attachment plate rotatably mounted to said support plate, a locking mechanism mounted to said support plate, said attachment plate, to lock said attachment plate in a predetermined position defining a flange orientated substantially perpendicular to the plane of the tape blade, said flange defining a keyway selectively holding an attachment member with a corresponding key and a locking member mounted to said attachment plate.

18. A tape measure device as claimed in claim 17 wherein said housing defines an aperture to receive said support plate and locking mechanism when said tape blade is retracted into said chamber.

19. A tape measure device as claimed in claim 17 wherein said support plate defines a cylindrical chamber, a slot leading to said cylindrical chamber, a flexible arm mounted adjacent said slot and a recess on the other side of said flexible arm, said slot being formed with a recess which receives an angular projection of a locking arm of said locking mechanism, said locking arm being provided with a rounded projection on the opposite side from said angular projections which engages said flexible arm and said attachment plate has a cylindrical post extending therefrom which is seated in said cylindrical chamber and pin means extending through the center axis of said cylindrical post and said support plate allowing rotational movement of said attachment plate.

20. A tape measure device as claimed in claim 19 wherein said flexible arm has a curved portion which faces said slot and engages said rounded projection of said locking arm and said cylindrical post is provided with a plurality of recesses which can receive an end of said locking arm to hold said attachment plate in predetermined angular positions in relation to the longitudinal axis of said tape blade.

\* \* \* \* \*